United States Patent

Wandl et al.

[11] Patent Number: 5,673,328
[45] Date of Patent: Sep. 30, 1997

[54] BONE CONDUCTING HEARING AID

[75] Inventors: Rudolf Wandl, Vienna; Kurt Schermann, Oberwart, both of Austria

[73] Assignee: Viennatone GmbH, Vienna, Austria

[21] Appl. No.: 432,762

[22] Filed: May 2, 1995

Related U.S. Application Data

[63] Continuation of Ser. No. 127,823, Sep. 27, 1993, abandoned.

[30] Foreign Application Priority Data

Oct. 7, 1992 [AT] Austria ................................. 1977/92

[51] Int. Cl.⁶ ......................................................... H04R 25/00
[52] U.S. Cl. ............................... 381/151; 381/68.3; 381/68.5
[58] Field of Search ................................... 381/151, 68.3, 381/68, 68.6, 68.7, 200, 68.5, 23.1; 600/25

[56] References Cited

U.S. PATENT DOCUMENTS

| | | | |
|---|---|---|---|
| Re. 19,808 | 1/1936 | Kranz | 381/151 |
| 2,702,354 | 2/1955 | Chorpening | 381/151 |
| 2,832,842 | 4/1958 | Knauert | 381/151 |

*Primary Examiner*—Huyen Le
*Attorney, Agent, or Firm*—Burns, Doane, Swecker & Mathis, LLP

[57] ABSTRACT

A bone conducting hearing aid comprises a housing adapted to be pressed against a head of a user and a magnetic system held in the hearing aid housing. The magnetic system includes a permanent magnet, a coil, an armature of a soft magnetic material and a spring holding the armature. A conductor button is arranged to move with the armature, the conductor button being shaped to be brought into contact with the mastoid bone of the user's head, and a rubber bearing having a predetermined elastic constant holds a support spring for the conductor button on the hearing aid housing. To increase the difference between the useful signal and the spurious signal received by the hearing aid, the support spring has an elastic constant not exceeding 0.4 N/cm.

5 Claims, 2 Drawing Sheets

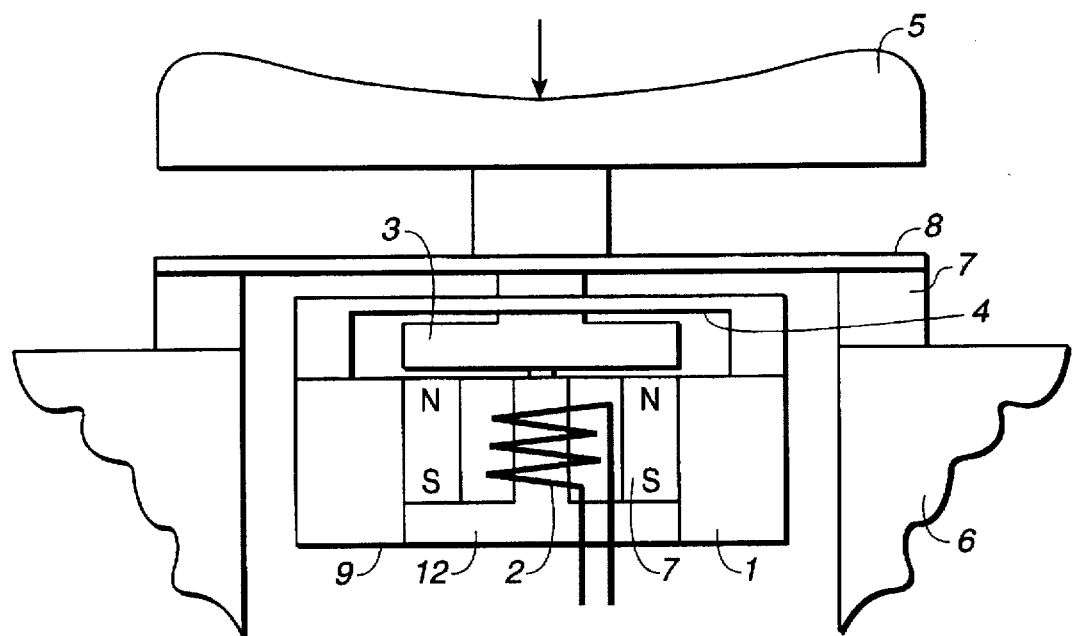
FIG._1
*(PRIOR ART)*
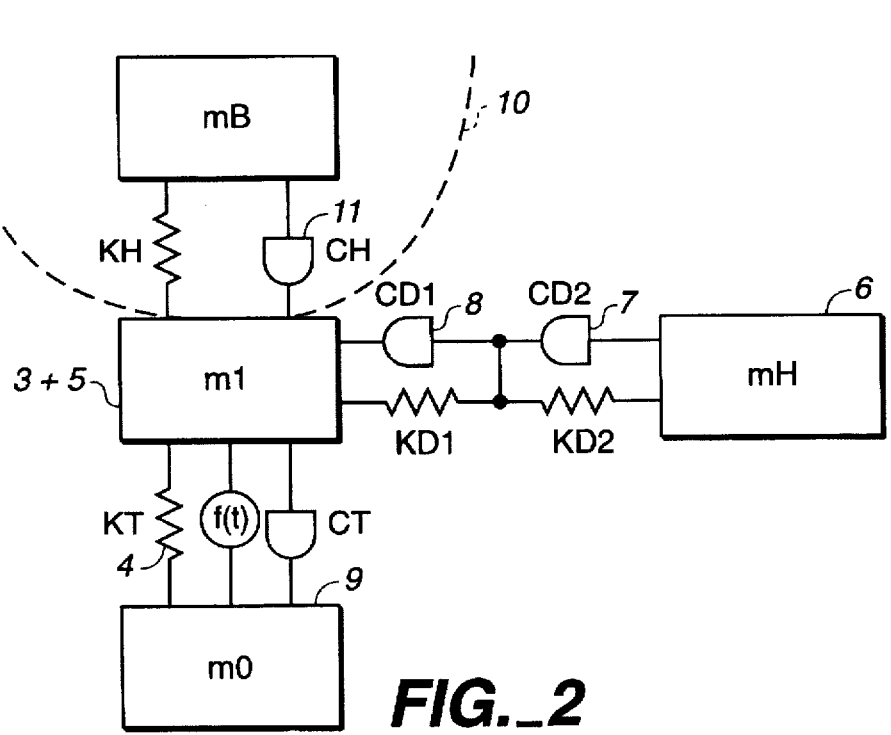
FIG._2

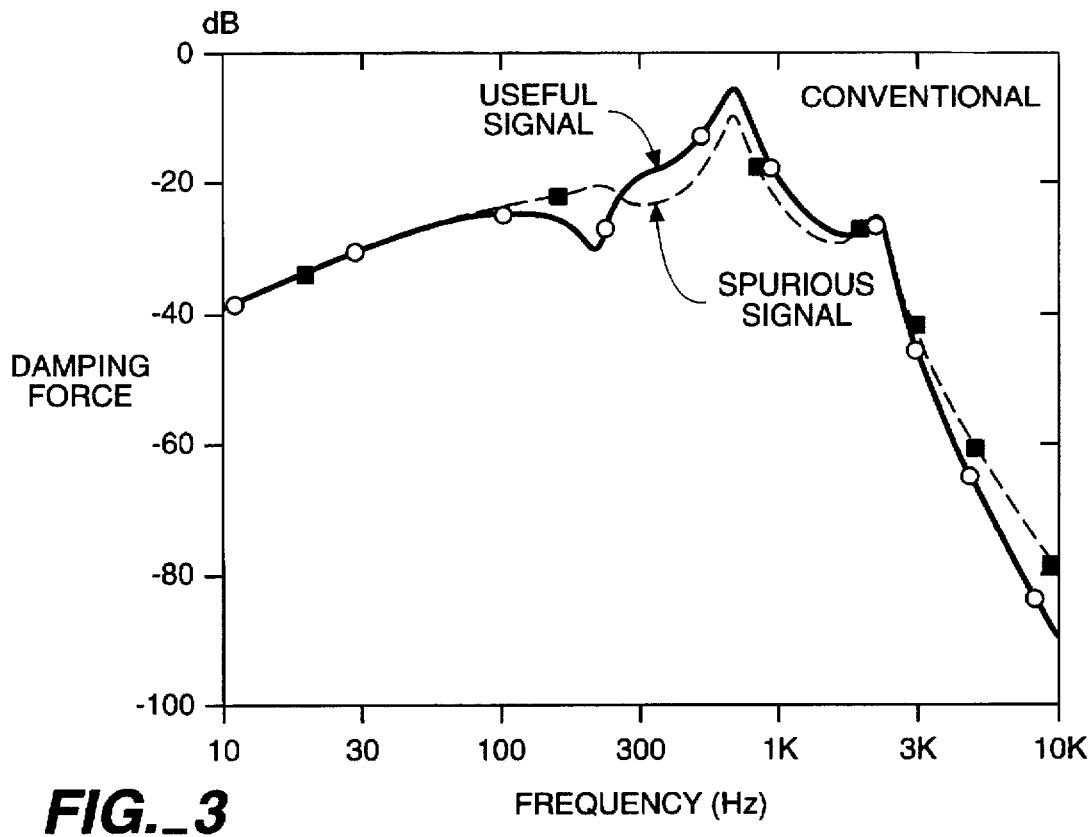
FIG._3
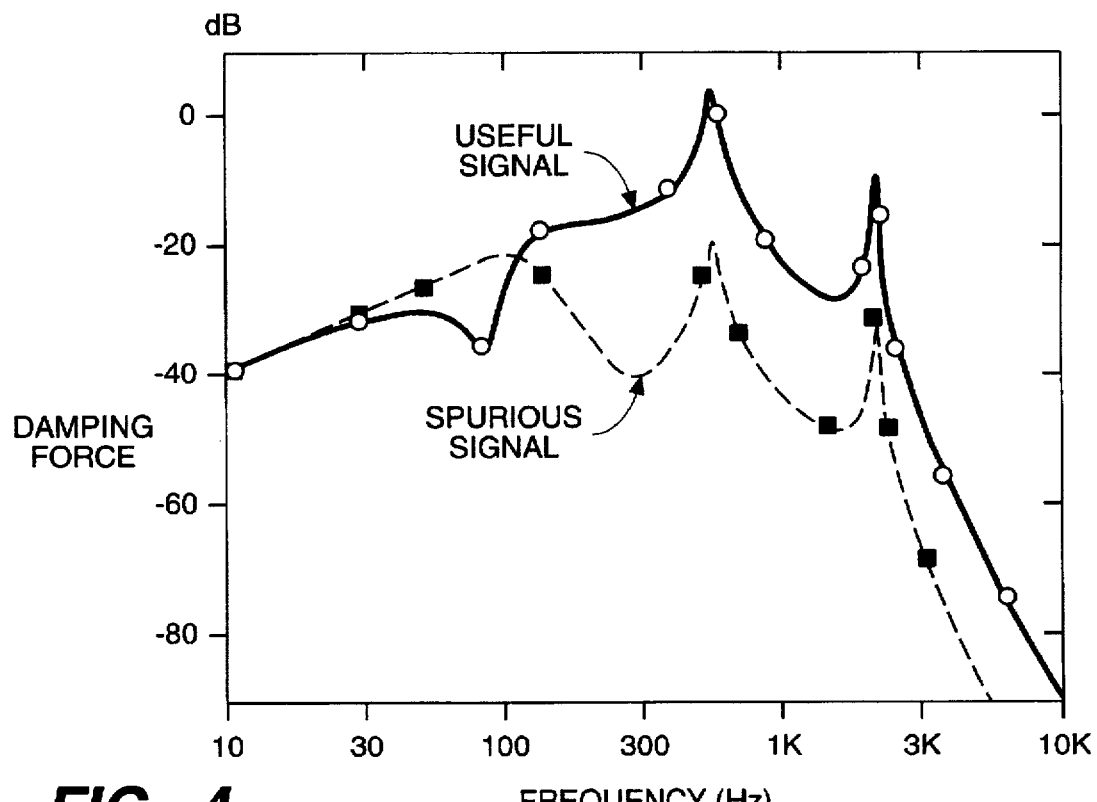
FIG._4

BONE CONDUCTING HEARING AID

This is a continuation of application Ser. No. 08/127,823 filed on Sep. 27, 1993, now abandoned.

BACKGROUND OF THE INVENTION

1. Field of the Invention

The present invention relates to a bone conducting hearing aid comprising a housing adapted to be pressed against a head of a user, a magnetic system held in the hearing aid housing, the magnetic system including a permanent magnet, a coil, an armature of a soft magnetic material and a spring holding the armature, and a conductor button arranged to move with the armature, the conductor button being shaped to be brought into contact with the mastoid bone of the user's head. A support made of an elastically deformable material, e.g. rubbers having a predetermined elastic constant holds a support spring for the conductor button on the hearing aid housing and serves to uncouple the support spring. The hearing aid housing may be incorporated in an eyeglass frame.

2. Description of the Prior Art

Such a bone conducting hearing aid is known and shown schematically in the fragmentary illustration of FIG. 1. The alternating current signal of an amplifier (not shown) is transmitted to the terminals oaf the magnetic system coil, which causes the armature in cooperation with the permanent magnetic field of the annular permanent magnet to vibrate because of the modulated magnetic field. These vibrations are transmitted by the conductor button, which moves with the armature, through the skin and the underlying layer of fat to the mastoid bone of the user, the required contact pressure being obtained by a suitable pre-tensioning of the hearing aid housing against the head of the user and by the support spring for the conductor button which is shaped to be brought into contact with the mastoid bone of the user's head. The housing may be incorporated in an eyeglass frame.

Conventionally, the parts of such a hearing aid have been dimensioned empirically with a view to obtaining the greatest power transmission to the mastoid bone with the smallest possible size of the hearing aid in the sound range to be transmitted. Ideally, the mass of the base with the built-in magnetic system should be infinitely large to transmit the entire vibration energy delivered by the armature to the mastoid bone of the user of the hearing aid. In reality, this mass must be finite and the base of the built-an magnetic system vibrates in counter-phase to the conductor button, which causes a portion of the vibration energy to be lost for transmission. Obviously, with an otherwise unchanged structure, the effectiveness of such a bone conducting hearing aid can be enhanced only by increasing the mass of said base with the magnetic system. This, on the other hand, runs counter to the requirement to make the hearing aid as slender and light as possible.

The empirical determination of the dimensioning of the hearing aid can be used only to a limited extent to obtain optimal conditions because of the multiplicity of the parameters to be influenced and the resultant number of required tests.

SUMMARY OF THE INVENTION

It is the primary object of this invention to overcome this disadvantage and to provide a bone conducting hearing aid in which the difference between the useful signal and the spurious signal is enhanced.

In a bone conducting hearing aid of the first-described structure, this and other objects are accomplished according to the invention by the use of a support spring having an elastic constant not exceeding 0.4 Newton per cm N/cm. Preferably, the elastic constants of the support spring and its support made of an elastically deformable material are equal.

BRIEF DESCRIPTION OF THE DRAWING

The above and other objects, advantages and features of the present invention will become more apparent from the following detailed description of certain preferred embodiments thereof, taken in conjunction with the accompanying schematic drawing wherein FIG. 1 is a fragmentary view of a conventional bone conducting hearing aid;

FIG. 2 diagrammatically illustrates a structure of a vibrating system in simplified form;

FIG. 3 shows a frequency diagram of a conventional hearing aid system; and

FIG. 4 is a like diagram of the hearing aid system according to this invention.

DETAILED DESCRIPTION OF THE PREFERRED EMBODIMENTS

FIG. 1 diagrammatically shows a conventional bone conducting hearing aid. Essentially, this hearing aid comprises housing 6 adapted to be pressed against a head of a user (not shown). The housing may be incorporated in a conventional eyeglass frame. A magnetic system is held in hearing aid housing 6 by base 9 and the magnetic system includes annular permanent magnet 1, coil 2 surrounded by the annular permanent magnet and armature 3 of a soft magnetic material. The annular permanent magnet is mounted on yoke 12 and spring 4 holds the armature, a small air gap being conventionally defined between permanent magnet 1 and armature 3.

Conductor button 5 is arranged to move with armature 3 when the same is vibrated upon excitation of the magnetic system, the conductor button being shaped to be brought into contact with the mastoid bone of the user's head (not shown). Support 7 made of an elastically deformable material like rubber having a predetermined elastic constant holds support spring 8 for conductor button 5 on the hearing aid housing 6. Base 9 with the magnetic system is held by armature spring 4 and armature 3 by support spring 8 and the latter is held on housing 6 by said elastic support 7. When the user puts on the eyeglasses, its frame will press hearing aid housing 6 incorporated therein against the head of the user and conductor button 5 against the mastoid bone.

During use, the output signals from an amplifier (not shown) will be transmitted to the terminals of coil 1, causing armature 3 to be vibrated and the vibrations to be transmitted by conductor button 5 through the skin and the underlying fat layer to the mastoid bone.

The simplified showing of a vibrating system in FIG. 2 illustrates the many conditions that need to be taken into consideration when to find an optimal dimensioning of such a hearing aid. In this figure, m1 indicates the mass of armature 3, together with conductor button 5 connected thereto;

m0 indicates the mass of base 9, together with magnet 1, yoke 12 and coil 2;

mB indicates the mass of head 10 of the user;

mH indicates the mass of hearing aid housing 6; and f(t) indicates the actual vibration generator or transducer (magnet 1, yoke 12, coil 2 and armature 3) which converts the output of the non-illustrated amplifier into a mechanical energy.

As FIG. 1 clearly shows, all the above-named masses are interconnected by elastic elements, each of which may be considered to be constituted by an ideal spring having an elastic constant k and a damping force C. The index H designates skin and fat layer 11 of the head of the user between conductor button 5 and the user's mastoid bone, index T designates armature spring 4, index D1 support spring 8 and index D2 elastic support 7 for support spring 8.

In a well constructed and dimensioned hearing aid of this type, as much energy as possible should be transmitted from mass m1, which is comprised of armature 3 and conductor button 5, to mass mB, which is comprised of the user's head, through signal path A, in which lies the skin and fat layer 11 of the user, to obtain a high efficiency. On the other hand, as little energy as possible should be transmitted by mass m1 to mass mH, which is constituted by housing 6, through signal path B, which is constituted by support spring 8 and elastic support 7, to avoid co-vibration of housing 6 and its built-in microphone (not shown).

For an optimal transmission through signal path A, there is a connection between elastic constant kH of skin and fat layer 11, which may be statically determined, and elastic constant kT of armature spring 4. To obtain a proper sound insulation of hearing aid housing 6, i.e. the temple of an eyeglass frame, an optimal relation between elastic constant kT of armature spring 4, kD1 of support spring 8 and kD2 of elastic support 7 for the support spring must be attained.

To obtain a predetermined relationship between mass m1 of armature 3 with conductor button 5 and mass m0 of base 9, with magnet 1, yoke 12 and coil 2, different pairs of elastic constants must be paired. Depending on the structure of the masses, spring and damping forces, a vibration frequency range will be amplified or damped. The transmittable frequency range can be increased and the efficiency may be enhanced by a suitable selection of these parameters. The characteristic for this selection is elastic constant kD1 of support spring 8 and elastic constant kD2 of elastic support 7 for support spring 8.

To obtain as stable a hearing aid as possible, it has heretofore been proposed to use as stiff a spring as possible for support spring 8, i.e. a spring having an elastic constant exceeding 0.7 N/cm, and to attempt to minimize the transmission of spurious noise to housing 6 by the use of a soft elastic support 7. Such a conventional system has a support spring whose elastic constant is much larger than that of its elastic support while damping force CD2 of elastic support 7 is much larger than damping force CD1 of support spring 8, the latter damping force, in turn, being much larger than damping force CT of armature spring 4 whose damping force was chosen to be as close as possible to zero.

As will be noted from FIG. 3 showing a frequency diagram of a conventionally dimensioned bone conducting hearing aid, the mutual decoupling of such a system is highly deficient and the transmission of the spurious signal to housing 6 is almost as great as that of the useful signal transmitted to the mastoid bone of the user. To avoid feedback, a very complicated mounting of the non-illustrated microphone in hearing aid housing 6 has been required. This disadvantage has been overcome if the elastic constant of support spring 8 does not exceed 0.4 N/cm, in which case a very distinct difference in the magnitude of the useful and spurious signals is obtained. Surprisingly, compared to conventional systems, the distance between the useful signal and the spurious signal has been improved by about 20 dB.

As shown by a comparison between FIGS. 3 and 4, respectively showing frequency diagrams of a conventional hearing aid and a hearing aid according to the invention, if the elastic constant of support spring 8 is no more than 0.4 N/cm, the useful signal will be considerably enhanced as compared to conventional systems, the figures showing the curves of the useful and spurious signals in a conventionally dimensioned hearing aid and the novel hearing aid. It has been found to be particularly advantageous if the elastic constants of support spring 8 and rubber bearing 7 are substantially equal.

The choice of elastic constants according to the present invention makes it possible to decrease the size and the weight of the hearing aid considerably, as compared to conventional hearing aids of this type with the same output efficiency. Furthermore, use may be made of much less complicated microphone mountings.

The more pronounced wave formation of the vibration frequency curve in the present hearing aid, which can be gleaned from FIG. 4, has no drawback in the use of the hearing aid since, to the contrary, the worse low sound reproduction in the median frequencies contributes to a better hearing in a noisy environment.

What is claimed is:

1. A bone conducting hearing aid incorporated in an eyeglass frame, comprising
   (a) a housing adapted to be pressed against a head of a user,
   (b) a magnetic system held in the hearing aid housing, the magnetic system including
       (1) a permanent magnet,
       (2) a coil,
       (3) an armature of a soft magnetic material and
       (4) a spring holding the armature,
   (c) a conductor button arranged to move with the armature, the conductor button being shaped to be brought into contact with the mastoid bone of the user's head,
   (d) a support made of an elastically deformable material, having a predetermined elastic constant and
   (e) a support spring for the conductor button, said elastically deformable support positioned between the housing and the support spring; said support holding the support spring on the hearing aid housing and the support spring having an elastic constant not exceeding 0.4 N/cm.

2. The bone conducting hearing aid of claim 1 wherein the conductor button transmits a useful signal, wherein a spurious signal is transmitted from the housing, and the spring constant of the support spring causes at least a maximum separation between the useful signal and the spurious signal of at least 10 db.

3. The bone conducting hearing aid of claim 1 wherein the conductor button transmits a useful signal, wherein a spurious signal is transmitted from the housing, and wherein the useful signal exceeds the spurious signal over a frequency range extending from about 100 Hz to in excess of 10,000 Hz.

4. A bone conducting hearing aid incorporated in an eyeglass frame, comprising:
   (a) a housing adapted to be pressed against a head of a user;
   (b) a magnetic system held in the hearing aid housing, the magnetic system including (1) a permanent magnet;
(2) a coil;
(3) an armature of a soft magnetic material and
(4) a spring holding the armature, (c) a conductor button arranged to move with the armature, the conductor button being shaped to be brought into contact with the mastoid bone of the user's head;

(d) a support made of an elastically deformable material, having a predetermined elastic constant and (e) a support spring for the conductor button, said elastically deformable support positioned between the housing and the support spring; said support holding the support spring on the hearing aid housing and the support spring having an elastic constant not exceeding 0.4 N/cm; and wherein the elastic constants of the support and the support spring are substantially equal.

5. The bone conducting hearing aid of claim 4, wherein the elastically deformable material is rubber.

* * * * *